United States Patent Office 3,279,844
Patented Oct. 18, 1966

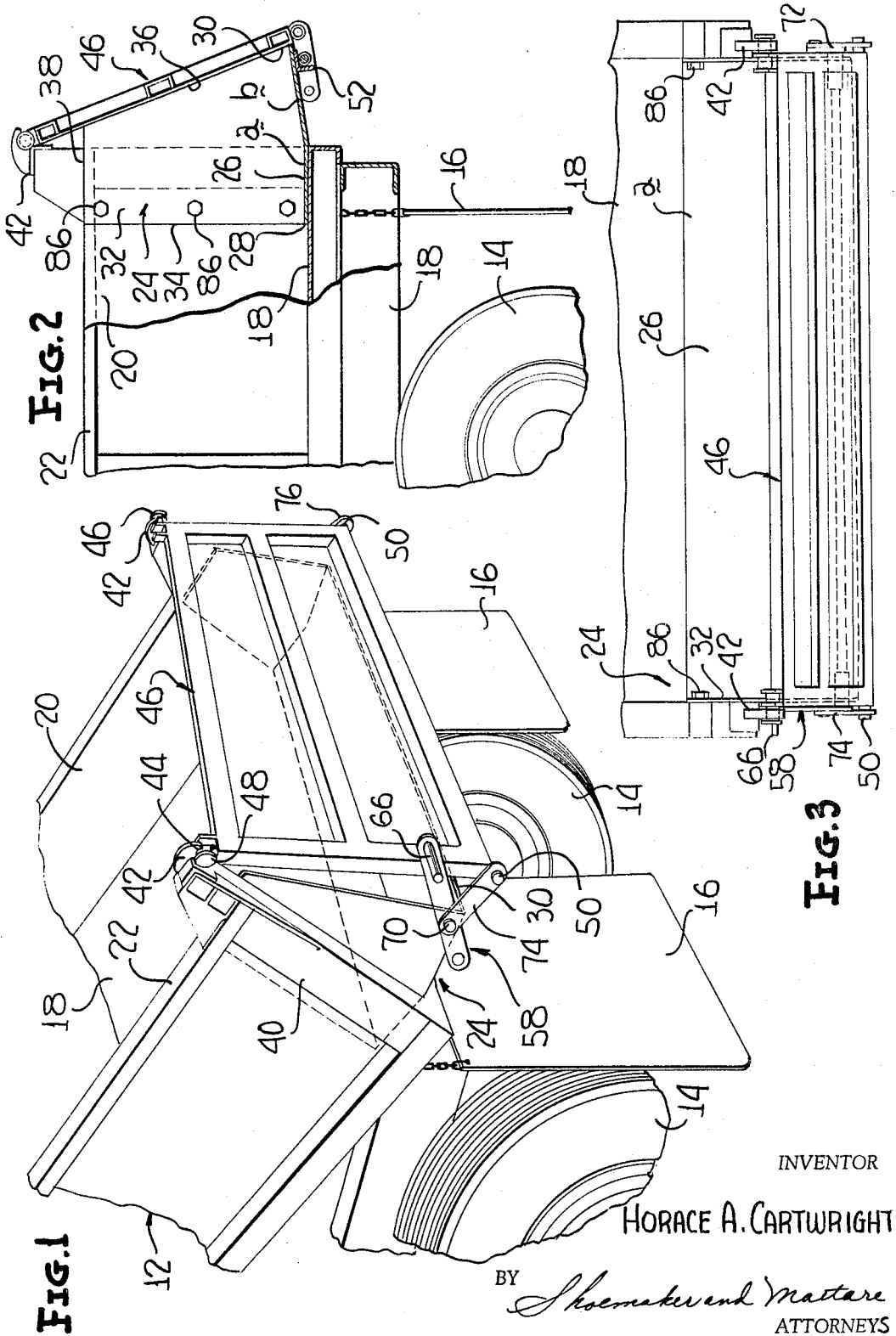

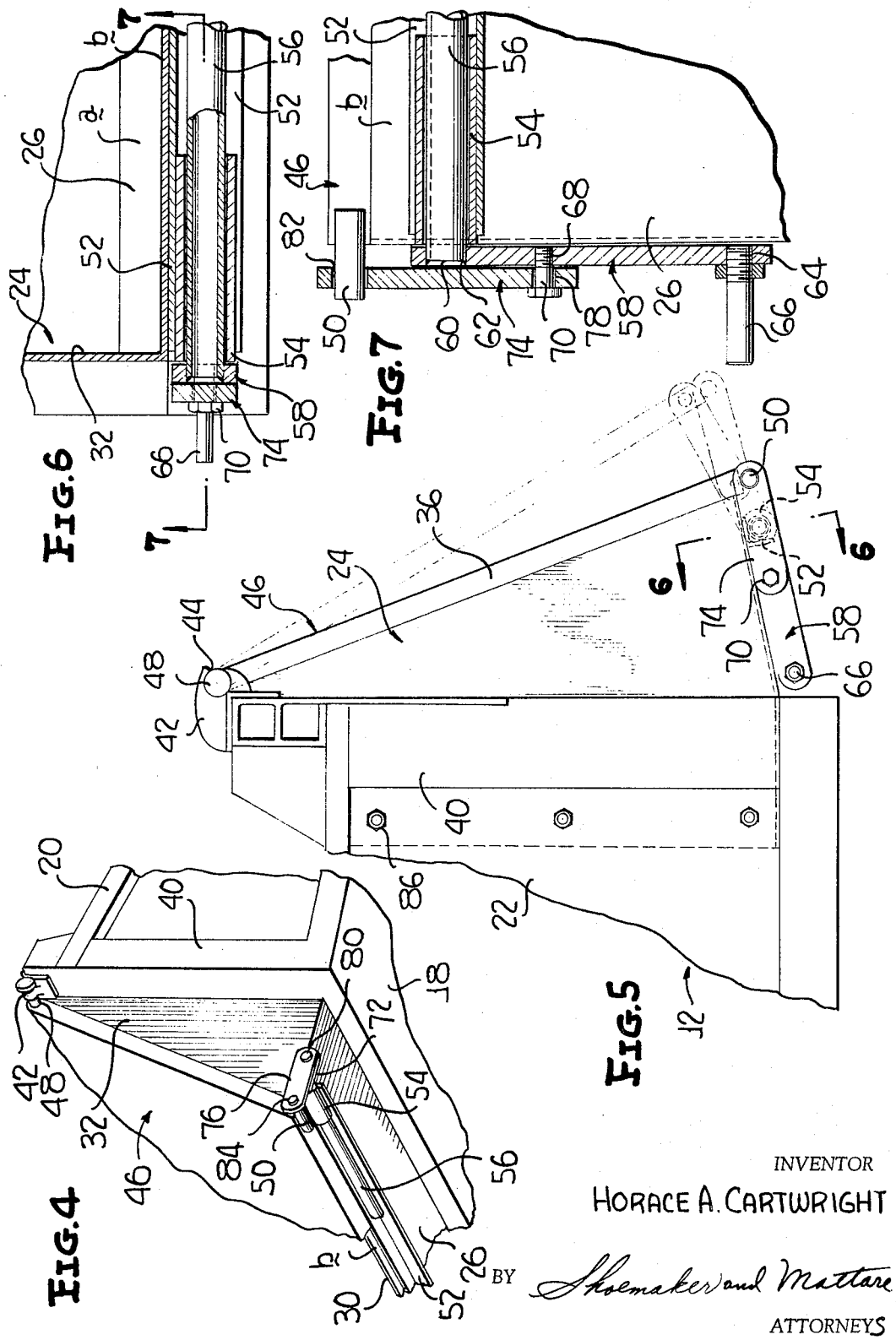

3,279,844
EXTENSION INSERT AND TAIL GATE OPERATOR
FOR DUMP TRUCKS
Horace A. Cartwright, 1166 Timberlake Drive,
Lynchburg, Va.
Filed June 5, 1964, Ser. No. 372,896
8 Claims. (Cl. 296—56)

This invention relates generally to the class of land vehicles and is directed particularly to improvements in the tail gate construction for dump trucks.

The invention is more especially designed as an extension insert for the rear end of a dump truck with a tail gate pivotally mounted thereon and with means for operating the tail gate.

The extension insert and tail gate operator form a unit for attachment to and installation in the rear end of a conventional dump truck in place of the conventionally hung or mounted tail gate, whereby such truck with the present invention installed on the body thereof may be effectively used for pulling a road coating machine and having the body raised to a dumping position for discharging stone into the stone distributor of the trailing coating machine.

Convential dump trucks are commonly employed for pulling over a road surface, a machine for applying to the road surface a topping or surfacing material consisting of broken stone an bitumen. Such road coating machines have a stone receiving hopper into which the stone is fed or dumped from the raised body of the dump truck as the latter pulls the road coating machine along. During this operation when the truck swings into a curve the rear end of the elevated body will swing out on the outside of the curve beyond the stone receiving hopper of the coating machine which the the truck is pulling and consequently stone is spilled onto the roadway.

A particular object of the present invention is to provide a construction for the rear end of the body of the dump truck which will avoid this spilling of stone onto the road surface when the dump truck swings into a curve while pulling the coating machine.

More particularly the invention has for an object to provide an extension insert for the rear end of the conventional dump truck body which provides a floor extension for the dump truck body which is so constructed and arranged as to form a chute or bridge which projects down into the coating machine hopper when the dump truck body is elevated and maintain its bridging position when the dump truck starts to move into a curve and thus prevent the formation or opening of a gap between the stone receiving hopper and the rear end of the dump truck.

Another object of the invention is to provide an extension insert of the character described, upon which the tail gate is hung to swing outwardly at the bottom thereof, with novel means operatively coupling the tail gate with the rearwardly projecting portion of the extension insert, for facilitating the swinging of the tail gate to opened and closed position.

Another object of the invention is to provide an extension insert for dump trucks which is designed to be securely bolted in operative position in the dump truck for use and easily removed therefrom if the dump truck is required for other operations.

The invention broadly contemplates the provision of two vertically disposed plate members which are arranged in spaced parallel relation and are designed to be placed each against the inner side or inner surface of a side wall of a dump truck and secured thereto. Each plate extends only part way into the truck body so that a portion of each plate projects rearwardly from the side wall to which it is attached and these plates are connected together by a base or floor plate.

The projecting portion of each plate has a downwardly and rearwardly sloping rear edge and a bottom edge line which slopes upwardly and rearwardly and the floor plate where it joins this bottom edge line which slopes upwardly and rearwardly, also has the same slope. The upwardly and rearwardly sloping rear portion of the floor plate of the insert starts its slope from the rear enge of the floor of the truck and projects a substantial distance beyond the latter.

The truck tail gate is hung in the regular manner from hangers at the top of the side walls and closes against the downwardly and rearwardly inclined edges of the side plates and against the rear transverse edge of the projecting portion of the floor plate.

The tail gate is connected at the bottom and and on each side by an over-center crank and throw bar with the underside of the projecting portion of the floor plate. One of the cranks is of greater length than the other and carries on its free end a handle for manual grasping so that it may be swung from a gate closed to a gate opened position an vice versa which operation imparts a corresponding pivotal movement to the crank on the opposite side whereby the throw bars, each of which is directly coupled between a crank and the adjacent side edge of the tail gate, either force the tail gate to swing out to opened position or to swing inwardly to closed position.

The invention will be best understood from a consideration of the following detailed description taken in association with the accompanying drawings, forming a of the specification and wherein:

FIG. 1 is a view in perspective of a portion of the rear end of a dump truck showing the body elevated to dumping position and showing the extension insert and tail gate operator of the present invention attached thereto, the tail gate being in partly opened position.

FIG. 2 is a view in section taken longitudinally of the truck body and in the vertical plane through the tail gate and the portion of the truck body and showing the inner side of one of the side plates of the insert.

FIG. 3 is a view in top plan if the rear of the truck showing the tail gate in closed position.

FIG. 4 is a view in perspective of the rear right corner of the truck body and illustrating the short right hand crank and the right hand throw bar, the tail gate being in closed position.

FIG. 5 is a view in side elevation on an enlarged scale of the left side of the rear end portion of the dump truck showing the tail gate closed and in broken lines showing the open position of the tail gate and the positions of the hand crank and throw bar.

FIG. 6 is a vertical section taken substantially on the line 6–6 of FIG. 5 and on an enlarged scale, the section being in the left side only of the insert structure.

FIG. 7 is a sectional view taken substantially on the line 7–7 of FIG. 6 and looking upwardly from below the floor plate projection and the tail gate.

Referring now more particularly to the drawings, numeral 10 generally designates a portion of the rear of a dump truck frame on which is pivotally mounted the dump truck body, the rear end portion only of which is shown and which is generally designated 12.

The rear supporting wheels are designated 14, the numeral 16 designating the usual mud shields which are suspended behind the rear wheels.

The floor of the truck body is designated 18 while the right and left side walls are designated 20 and 22 respectively. The extension insert of the present invention is adapted to be placed or set in the truck body between the side walls 20 and 22, at the rear thereof. This insert is generally in the form of a U-shaped structure and is designated as a whole by the reference character 24. The insert comprises a floor plate 26 which is of a length substantially conforming to the inside width of the truck body and is of substantial transverse width from the inner longitudinal edge 28 thereof to the outer or rear longitudinal edge 30.

At each end of the floor plate 26 is an upstanding side or wing plate 32 which, at its bottom end is of the same width as the floor plate 26. Each wing plate has the inner vertical edge 34 and the outer downwardly and rearwardly inclined edge 36. This rear inclined edge 36 joins the top edge 38 which is here shown as being horizontal and which joins with the vertical forward edge or inner edge 34 to form a right angle. However, these edges 34 and 38 do not necessarily have to be vertical and horizontal as shown. This is, however, the preferred construction.

As is clearly shown in FIG. 2, the top edge of the side plate, or the side plates, forms an obtuse angle with the inclined rear edge 36.

The floor plate 26 is bent longitudinally intermediate the inner or forward edge 28 and the rear edge 30 whereby there is formed an inner portion a and an outer portion b. The inner portion a is here illustrated in FIG. 2 particularly, as paralleling the top edge 38 of the side or wing plate 32 shown in this figure, and of course this is true also of the opposite wing plate, whereby when the inner portion a is placed flat upon the floor 18 of the truck body as illustrated, with the line of bend between the two portions of the floor plate at the rear edge of the floor 18, the outer portion b extends rearwardly and in an upward incline from the floor of the truck body as shown.

The numeral 40 designates the existing reinforcing or rigidifying structure on the outer side of each side wall of the truck body at the rear end thereof and rising from each of these structures is the conventional or existing hanger post 42 for supporting the truck tail gate and each of these hanger posts is formed with the hinge slot or hinge pin slot 44 which faces and opens rearwardly.

The top edge 38 of each side plate 32 projects slightly beyond the rear vertical edge of the adjacent side wall of the truck body as shown in FIG. 2 and thus lies below the hinge pin slot 44 adjacent thereto.

The tail gate, generally designated 46, carries at each side edge, at the top thereof, the outwardly projecting hinge pin 48. These are existing pins on the conventional tail gate structure for pivotal engagement in the hinge slots 44 whereby the tail gate can swing relative to the rear end of the truck body. At the bottom of each vertical side edge of the tail gate is the outwardly or laterally projecting latch pin 50 which engages an existing catch (not here shown) on the truck body, when the gate is used with the truck body and without the insert structure.

The numeral 52 designates an angle bar which is secured longitudinally of the under side of the floor plate 26 to the outer portion and adjacent to the rear edge thereof as best seen in FIGS. 2 and 4. The inside angle of the bar 52 is disposed to face rearwardly. This angle bar 52 serves to strengthen or rigidify the floor plate and also to support a pair of tubular bearings 54 one adjacent to each end of the bar and positioned in the angle of the bar. These tubular bearings are rigidly secured in place as by welding or the like.

The numeral 56 designates a shaft, here shown as being tubular, which extends across the width of the floor plate and is rotatably supported at its ends in the tubular bearings 54 for turning or rotary movement.

At the left side of the insert there is rigidly attached to the end of the shafts 56, the relatively long crank lever 58. As shown in FIG. 7, this crank handle is provided at one end with the opening 60 in which the end of the shaft 56 is fitted where it is welded as indicated at 62.

At the opposite end from the shaft, the crank lever 58 is provided with an opening 64, preferably screw threaded, to receive the correspondingly threaded end of the crank handle 66.

Intermediate its ends the crank lever has formed therein the threaded aperture 68 for reception of the threaded end of a pivot screw 70.

At the opposite or right hand side of the insert structure, the tubular shaft 56 has rigidly secured thereto one end of a short crank lever 72, as best seen in FIG. 4.

The crank levers are connected to the tail gate carrying pins 50 by throw bars. The throw bar at the left side of the structure is designated 74 and the throw bar at the right side of the structure is designated 76.

Referring to FIG. 7, it will be seen that the throw bar 74 has a smooth aperture, or unthreaded aperture 78 therein, in which is received the unthreaded portion of the pivot screw 70 and a similar pivot screw, designated 80 provides a pivotal connection between an end of the throw bar 76 and the adjacent, or other, end of the short crank lever 72, the first-mentioned end of which crank lever is, as stated, rigidly secured to the adjacent end of the shaft 56.

Still referring to FIG. 7, it will be seen that the throw bar 74 has a smooth opening 82 formed therein which is provided to receive the outer end of the adjacent latch pin 50 and it will be understood, of course, that the corresponding end of the throw bar 76 has a similar opening at 84 to receive the adjacent pin 50 as shown in FIG. 4.

It will be seen from the foregoing that throw bars 74 and 76 may be easily slipped from their respective pins 50 carried by the tail gate when it is desired to remove the extension insert and mount the tail gate for use in the usual or conventional manner.

The crank levers and throw bars form or provide a toggle joint coupling between the floor plate and the lower edge of the tail gate whereby when the crank lever 58 is swung in one direction, forwardly, for example, the pivot pins 70 and 80 will swing over the center of rotation of the crank levers and pull the tail gate to closed position. Of course, reverse swinging of the crank lever 58 will force the tail gate to opened position as will be readily apparent.

The side plates 32 of the insert are provided with a vertical row of suitable openings for receiving bolts 86, extensible into corresponding bolt openings, not shown, in the adjacent side walls of the truck body for bolting the insert firmly in position in the manner as shown. After the insert structure has been secured in position, the tail gate may be replaced by hanging it in the normal manner from the posts 42 so that it will swing down to closed position against the edges 30 and 36 of the floor plate and side plates respectively and the outer or free ends of the throw bars may then be slipped onto the latch pins 50 of the tail gate and the entire structure is then ready for operation.

While only one crank handle has been shown, that is the handle 66 attached to the left hand crank lever, obviously, a similar crank handle may be provided at the right hand side of the structure upon a long crank lever in replacement of the short lever 72 which has been illustrated.

From the foregoing to will be apparent that there is provided by the present invention a novel extension insert and tail gate operator structure which can be easily and quickly installed in the rear end of a suitably constructed dump truck or a dump truck of conventional construction, for use in connection with the operation of a road surfacing machine. Such extension insert structure will facilitate the ready discharge of stone from the dump truck into the receiving hopper of a trailing road surfacing machine and will permit the making of turns without the separation of the rear end of the dump truck body from the receiving hopper of the road surfacing machine and the discharge of stone onto the ground as now happens in using a conventional dump truck body for the stone supplying operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. In combination with a dump truck body structure having a floor having a substantially straight transverse rear edge, side walls and a rear end pivotally hung tail gate, a rear end extension insert unit position in part within the truck body between said side walls and comprising a floor plate supported upon the floor of the truck body and having a portion extending rearwardly from said body beyond said floor rear edge in a plane slanting upwardly from the body floor when the latter is substantially level, vertical side plates each having a portion within the body positioned at the inner side of a side wall thereof and a portion extending rearwardly from said side wall of said body beyond the said floor rear edge, each side plate joined at its bottom end to said floor plate, means securing the said portions of the side plates lying within the body to the adjacent truck side walls, each side plate rearwardly extending portion having a downwardly and rearwardly sloping rear edge and said upward slanting portion of said floor plate having a rear edge, said sloping and floor plate edges being in a common plane and adapted to have said tail gate rest thereagainst when closed, and means coupling the rear portion of the insert unit with the tail gate for facilitating opening and closing swinging movements of the tail gate.

2. The invention as defined by claim 1 wherein the last said means comprises a toggle joint linkage in which an element of one toggle joint comprises a crank means for effecting the extension and retraction of the linkage.

3. A rear end extension insert for a dump truck body having a rear end pivotally hung tail gate, said extension insert comprising a substantially U-shaped structure embodying a floor plate and upstanding side plates, the floor plate having inner and outer longitudinal edges and being bent along a longitudinal line between said longitudinal edges to provide a forward portion and a rearward portion, said rearward portion being disposed at an upward inclination when the said forward portion is disposed horizontally and said side plates having inclined rear edges which form an acute angle with said rearward portion and against which edges and the outer longitudinal edge of the rearward portion the pivoted tail gate closes when the insert structure is installed in the rear end of the truck body, and means for coupling the said rearward portion of said structure with the tail gate whereby opening and closing movements may be imparted to the latter, which comprises a toggle joint linkage at each side of the insert structure and having the remote ends of the links pivotally connected to the rear part of said rearward portion and to the lower part of the tail gate, with one link of at least one joint forming a crank lever.

4. A rear end extension insert for a dump truck body having a floor, side walls and a rear end pivotally hung tail gate, said insert comprising a substantially U-shaped structure having a length approximately equal to the width of the truck body between the opposed inner surfaces of the walls thereof, said structure embodying a long relatively wide floor plate joined at its ends to upstanding side plates, the floor plate having inner and outer longitudinal edges and being bent along a longitudinal line between said edges whereby are formed inner and outer angularly related portions, said outer portion extending at an upward incline from the rear edge of the truck body floor when the inner portion is positioned horizontally thereon with the said longitudinal line at the said rear edge of the floor, said side plates each having a rear edge disposed at a downward and rearward inclination and intersecting the longitudinal edge of said outer portion, the side plates being adapted to be positioned with a portion of each thereof against the inner surface of a body wall, means for securing said side plates to the adjacent body walls, said edges of the side plates and the longitudinal edge of the rearward portion being adapted to have the tail gate close thereagainst, and actuator means between the tail gate and the body structure for effecting opening and closing of the tail gate, which comprises a toggle joint linkage embodying a crank lever and a thrust bar, the crank lever being pivotally connected at one end to the rearward portion of the floor plate, the thrust bar being pivotally connected at one end to the tail gate and there being a pivotal connection between the crank lever and the thrust bar, and means for applying operating force to the last-mentioned pivotal connection.

5. A rear end extension insert for a dump truck body having a floor, side walls and a rear end pivotally hung tail gate, said insert comprising a substantially U-shaped structure having a length approximately equal to the width of the truck body between the opposed inner surfaces of the walls thereof, said structure embodying a long relatively wide floor plate joined at its ends to upstanding side plates, the floor plate having inner and outer longitudinal edges and being bent along a longitudinal line between said edges whereby are formed inner and outer angularly related portions, said outer portion extending at an upward incline from the rear edge of the truck body floor when the inner portion is positioned horizontally thereon with the said longitudinal line at the said rear edge of the floor, said side plates each having a rear edge disposed at a downward and rearward inclination and intersecting the longitudinal edge of said outer portion, the side plates being adapted to be positioned with a portion of each thereof against the inner surface of a body wall, means for securing said side plates to the adjacent body walls, said edges of the side plates and the longitudinal edge of the rearward portion being adapted to have the tail gate close thereagainst, and actuator means between the tail gate and the body structure for effecting opening and closing of the tail gate, a shaft extending longitudinally of the said rearward portion of the floor plate and mounted thereon on the under side thereof for rotation and a toggle joint linkage at each end of the floor plate and each toggle joint linkage comprising a crank lever and a thrust bar, the crank lever being rigidly secured at one end to the adjacent end of the said shaft, the thrust bar being pivotally coupled at one end to the adjacent end of the tail gate and there being a pivotal connection between the crank lever and the thrust bar, and at least one of the crank levers being of greater length than the other and having a free end to which a handle means is attached for facilitating application of operating force to the last-mentioned pivotal connection.

6. The invention as defined in claim 5, wherein the pivotal coupling between the said one end of the thrust bar and the tail gate is effected by an aperture in the thrust bar having an existing latch pin on the tail gate removably engaged therein.

7. A rear end extension insert structure for a dump truck body having a floor, side walls spaced apart a certain distance transversely thereof and a rear end pivotally hung tail gate suspended from said side walls, said extension insert comprising a substantially U-shaped structure embodying a floor plate and upstanding side plates carried by said floor plate and spaced apart a distance corresponding to said side wall spacing for positioning between said truck body side walls, the floor plate having inner and outer longitudinal edges and being bent along a longitudinal line between said longitudinal edges to provide a forward portion and a rearward portion, said rearward portion being disposed at an upward inclination when the said forward portion is disposed horizontally in operative position on the truck floor and said side plates having inclined rear edges which form an acute angle with said rearward portion and against which edges and the outer longitudinal edge of the rearward portion the pivoted tail gate closes when the insert structure is installed in the rear end of the truck body, and means for coupling the said rearward portion of said structure with the tail gate whereby opening and closing movements may be imparted to the latter.

8. A rear end extension insert for a dump truck body having a floor terminating in a transverse rear edge, side walls spaced a certain distance apart and a rear end pivotally hung tail gate on said side walls, said insert constituting a unit separate from the dump body and comprising a substantially U-shaped structure having a length approximately equal to the said distance between the opposed inner surfaces of the said walls of the truck body, said structure embodying a long relatively wide floor plate joined at its ends to upstanding side plates, the floor plate having inner and outer longitudinal edges and being bent along a longitudinal line between said edges whereby are formed inner and outer angularly related substantially plane portions, said outer portion extending at an upward incline from the said rear edge of the truck body floor when the inner portion is positioned horizontally thereon with the said longitudinal line at the said rear edge of the floor, said side plates each having a rear edge disposed at a downward and rearward inclination in the said longitudinal position of said inner portion and intersecting the longitudinal edge of said outer portion, the side plates being adapted to be positioned with a portion of each thereof against the inner surface of a body wall, means for securing said side plates to the adjacent body walls, said edges of the side plates and the longitudinal edge of the rearward portion being disposed in the operative position of the insert to have the tail gate close thereagainst, and actuator means between the tail gate and the body structure for effecting opening and closing of the tail gate.

References Cited by the Examiner
UNITED STATES PATENTS

| | | | |
|---|---|---|---|
| 2,212,058 | 8/1940 | Wood | 296—56 X |
| 2,852,873 | 9/1958 | Benz | 298—7 X |

BENJAMIN HERSH, *Primary Examiner.*

P. GOODMAN, *Assistant Examiner.*